United States Patent
Fuke et al.

(10) Patent No.: US 10,618,497 B2
(45) Date of Patent: Apr. 14, 2020

(54) UNLOCKING CONTROL SYSTEM AND UNLOCKING CONTROL METHOD

(71) Applicant: TOYOTA JIDOSHA KABUSHIKI KAISHA, Toyota-shi, Aichi-ken (JP)

(72) Inventors: Jumpei Fuke, Toyota (JP); Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 16/033,354

(22) Filed: Jul. 12, 2018

(65) Prior Publication Data

US 2019/0047513 A1 Feb. 14, 2019

(30) Foreign Application Priority Data

Aug. 9, 2017 (JP) ................................. 2017-154580

(51) Int. Cl.

| | |
|---|---|
| B60R 25/24 | (2013.01) |
| G06Q 10/08 | (2012.01) |
| G07C 9/00 | (2020.01) |
| H04L 29/08 | (2006.01) |
| B60R 25/25 | (2013.01) |

(Continued)

(52) U.S. Cl.
CPC ............. B60R 25/24 (2013.01); B60R 25/01 (2013.01); B60R 25/241 (2013.01); B60R 25/25 (2013.01); G06Q 10/083 (2013.01); G06Q 10/0832 (2013.01); G07C 9/00563 (2013.01); G07C 9/00571 (2013.01); G07C 9/00896 (2013.01); H04L 9/3226 (2013.01); H04L 63/0861 (2013.01); H04L 67/12 (2013.01);

(Continued)

(58) Field of Classification Search
CPC .. G06Q 10/0832; G07C 9/00896; B60R 25/01
See application file for complete search history.

(56) References Cited

U.S. PATENT DOCUMENTS

| | | |
|---|---|---|
| 2004/0243426 A1 | 12/2004 | Hashimoto |
| 2015/0215779 A1 | 7/2015 | Fokkelman et al. |

(Continued)

FOREIGN PATENT DOCUMENTS

| | | |
|---|---|---|
| JP | 2006-206225 A | 8/2006 |
| JP | 2011-195226 A | 10/2011 |

(Continued)

Primary Examiner — Nabil H Syed
(74) Attorney, Agent, or Firm — Oliff PLC

(57) ABSTRACT

A server receives first identification information unique to a user of a vehicle from a first terminal device, receives second identification information unique to a user of a second terminal device from the second terminal device, generates second authentication information based on the first identification information, the second identification information, and first authentication information stored in a first storage unit, and transmits the second authentication information to the second terminal device. A vehicle verifies authenticity of the second authentication information acquired from the second terminal device based on the first identification information and the second identification information acquired from the second terminal device, and the first authentication information stored in a second storage unit, and in a case where authenticity is confirmed, unlocks a storage.

4 Claims, 5 Drawing Sheets

(51) Int. Cl.

| | | |
|---|---|---|
| *H04L 29/06* | (2006.01) | |
| *H04W 12/06* | (2009.01) | |
| *B60R 25/01* | (2013.01) | |
| *H04L 9/32* | (2006.01) | |
| *H04W 4/35* | (2018.01) | |

(52) U.S. Cl.
CPC ............ *H04W 4/35* (2018.02); *H04W 12/06* (2013.01); *G07C 2009/0092* (2013.01); *H04L 2209/84* (2013.01)

(56) References Cited

U.S. PATENT DOCUMENTS

2016/0098871 A1* 4/2016 Oz ..................... G07C 9/00111
340/5.61
2018/0242768 A1* 8/2018 Lewis .................. A47G 29/141

FOREIGN PATENT DOCUMENTS

| WO | 2013/092306 A2 | 6/2013 |
|---|---|---|
| WO | 2016/054271 A1 | 4/2016 |
| WO | 2016/099623 A1 | 6/2016 |

* cited by examiner

UNLOCKING CONTROL SYSTEM AND UNLOCKING CONTROL METHOD

INCORPORATION BY REFERENCE

The disclosure of Japanese Patent Application No. 2017-154580 filed on Aug. 9, 2017 including the specification, drawings and abstract is incorporated herein by reference in its entirety.

BACKGROUND

1. Technical Field

The present disclosure relates to an unlocking control system and an unlocking control method that perform unlocking control of a storage, such as a trunk in a vehicle.

2. Description of Related Art

Japanese Unexamined Patent Application Publication No. 2006-206225 (JP 2006-206225 A) describes a delivery article reception system capable of receiving a delivery article using a trunk of a vehicle. In the system of JP 2006-206225 A, a communication device in a loading vehicle compares an authentication code received from a communication device in a delivering vehicle with an authentication code registered in advance to perform authentication, and in a case where authentication is established, a trunk lid of the loading vehicle is unlocked.

SUMMARY

In the system of JP 2006-206225 A, since authentication is performed using a fixed authentication code, security is insufficient. As a method of improving security and suppressing unauthorized unlocking of the trunk of the vehicle, for example, a method of performing authentication using a one-time password is considered.

However, in a case where a terminal device that is used in unlocking processing of the trunk of the vehicle is robbed, unlocking may be made in an unauthorized manner due to spoofing; thus, there is room for improvement on the method using the one-time password for security.

The disclosure provides an unlocking control system and an unlocking control method that control unlocking of a storage, such as a trunk in a vehicle, with further improved security.

A first aspect of the disclosure relates to an unlocking control system including a first terminal device, a second terminal device different from the first terminal device, a server configured to communicate with the first terminal device and the second terminal device, and a vehicle having a storage of a cargo and configured to communicate with the second terminal device. The server includes a first storage unit configured to store first authentication information. The server is configured to receive first identification information unique to a user of the vehicle from the first terminal device and confirm authenticity of the received first identification information. The server is configured to receive second identification information unique to a user of the second terminal device from the second terminal device and confirm authenticity of the received second identification information. The server is configured to generate second authentication information based on the authentic first identification information acquired from the first terminal device, the authentic second identification information acquired from the second terminal device, and the first authentication information stored in the first storage unit. The server is configured to transmit the generated second authentication information and the first identification information acquired from the first terminal device to the second terminal device. The vehicle includes a second storage unit configured to store the first authentication information and an electronic control unit. The electronic control unit is configured to receive the second authentication information and the first identification information transmitted from the server from the second terminal device. The electronic control unit is configured to verify authenticity of the second authentication information acquired from the second terminal device based on the first identification information and the second identification information acquired from the second terminal device, and the first authentication information stored in the second storage unit. The electronic control unit is configured to in a case where the authenticity of the second authentication information acquired from the second terminal device is confirmed, unlock the storage.

According to the first aspect of the disclosure, since permission and prohibition of unlocking of the storage is determined based on authentication using the first identification information unique to the user of the vehicle, the second identification information unique to the user of the second terminal device, and the second authentication information generated in the server, falsification or spoofing of information for use in authentication is difficult, and it is possible to further improve security.

In the unlocking control system according to the first aspect of the disclosure, the server may be further configured to receive third identification information unique to the second terminal device from the second terminal device, and generate the second authentication information using the third identification information in addition to the first identification information and the second identification information. The electronic control unit of the vehicle may be configured to verify the authenticity of the second authentication information based on the first identification information, the second identification information, and the third identification information acquired from the second terminal device, and the first authentication information stored in the second storage unit.

According to the first aspect of the disclosure, since information for use in authentication further increases, it is possible to further improve security.

In the unlocking control system according to the first aspect of the disclosure, the server may be configured to generate the second authentication information using fourth identification information in addition to the first identification information, the second identification information, and the third identification information, and transmit the fourth identification information to the second terminal device along with the second authentication information and the first identification information. The electronic control unit of the vehicle may be configured to verify the authenticity of the second authentication information based on the first identification information, the second identification information, the third identification information, and the fourth identification information acquired from the second terminal device, and the first authentication information stored in the second storage unit.

According to the first aspect of the disclosure, since information for use in authentication further increases, it is possible to further improve security.

In the unlocking control system according to the first aspect of the disclosure, the first identification information and the second identification information may include biological information of the user of the first terminal device and biological information of the user of the second terminal device, respectively.

According to the first aspect of the disclosure, since falsification or spoofing of the first identification information and the second identification information is difficult, it is possible to further improve security.

A second aspect of the disclosure relates to an unlocking control method that unlocks a storage of a vehicle based on an unlocking request from a second terminal device, in an unlocking control system including a first terminal device, the second terminal device different from the first terminal device, a server configured to communicate with the first terminal device and the second terminal device, and the vehicle having the storage of a cargo and configured to communicate with the second terminal device. The unlocking control method includes transmitting first identification information from the first terminal device to the server, causing the server to receive the first identification information and store the received first identification information in a first storage unit, causing the server to perform a predetermined arithmetic operation using the received first identification information to generate first authentication information, causing the server to transmit the first authentication information and an arithmetic algorithm to the vehicle, transmitting second identification information from the second terminal device to the server, causing the server to receive the second identification information and store the received second identification information in the first storage unit, transmitting third identification information from the second terminal device to the server, causing the server to receive the third identification information and store the received third identification information in the first storage unit in association with the second identification information, transmitting an unlocking request for unlocking of the storage of the vehicle, the second identification information, the third identification information from the second terminal device to the server, causing the server to confirm authenticity of the received second identification information and third identification information, in a case where the second identification information and the third identification information are confirmable to be authentic, causing the server to transmit, to the first terminal device, unlocking request notification indicating that there is an unlocking request, in a case where the first terminal device receives the unlocking request notification from the server, transmitting an unlocking approval approving the unlocking of the storage of the vehicle and the first identification information from the first terminal device to the server, in a case where the first identification information is received, causing the server to confirm the authenticity of the received first identification information, in a case where the received first identification information is confirmable to be authentic, causing the server to generate second authentication information using the first identification information acquired from the first terminal device along with the unlocking approval, the second identification information and the third identification information acquired from the second terminal device along with an unlocking request, and the first authentication information stored in the first storage unit, causing the server to transmit the generated second authentication information and the first identification information acquired along with the unlocking approval to the second terminal device, in a case where the second authentication information and the first identification information are received, causing the second terminal device to transmit the received second authentication information and first identification information, the second identification information, and the third identification information to the vehicle, and in a case where the second authentication information and the first identification information, and the second identification information and the third identification information are received from the second terminal device, causing the vehicle to execute authentication processing and to unlock the storage.

According to the aspect of the disclosure, it is possible to further improve security in an unlocking control system that controls unlocking of a storage, such as a trunk in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

An unlocking control system according to the aspect of the disclosure controls unlocking of a storage such that a cargo of a home delivery service can be received using the storage, such as a trunk in a vehicle. In the unlocking control system according to the aspect of the disclosure, authentication processing in the vehicle is performed using at least identification information unique to a user of a vehicle, identification information unique to a home delivery driver, and a result of a predetermined authentication arithmetic operation performed in a server in advance. Since the authentication processing in the vehicle is performed by combining a plurality of pieces of information, falsification or spoofing of information for use in authentication is difficult, and it is possible to further improve security.

Embodiment

Figure 1:
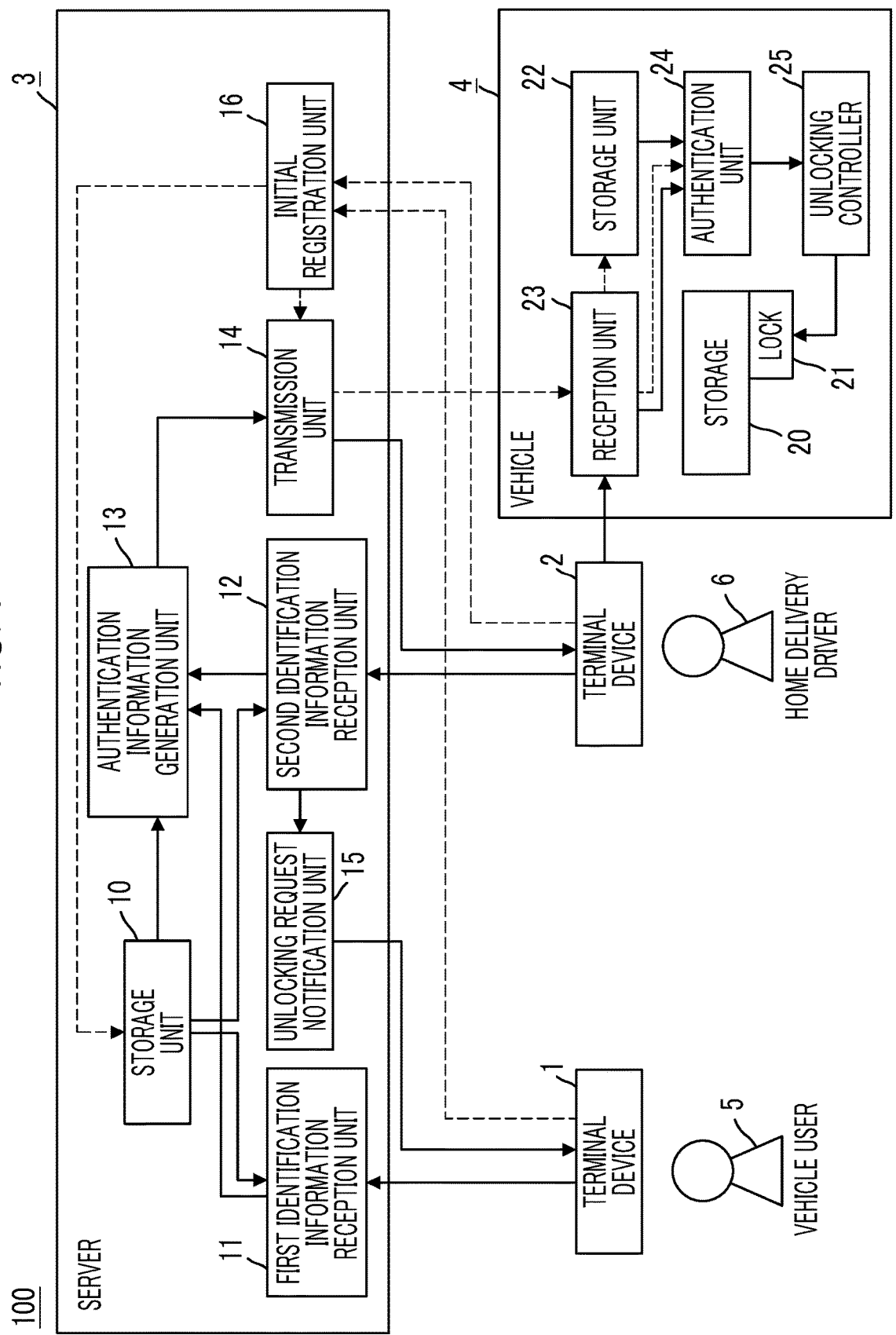
FIG. 1 is a functional block diagram of an unlocking control system according to an embodiment of the disclosure.
Figure 2:
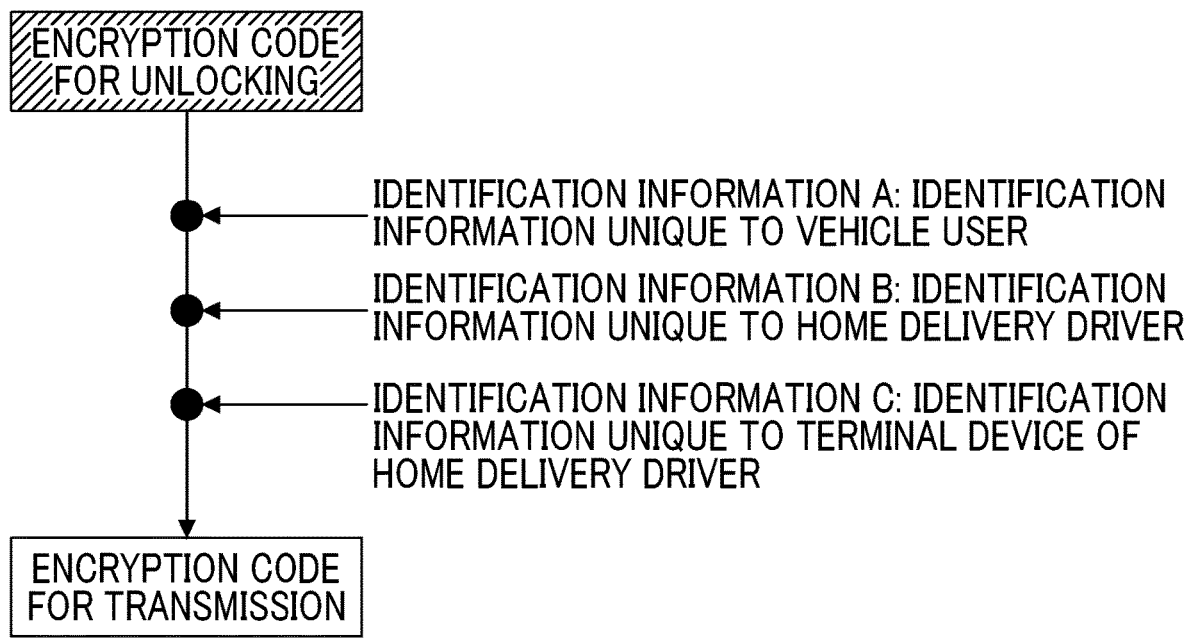
FIG. 2 is a diagram schematically showing authentication information generation processing that an authentication information generation unit of a server shown in FIG. 1 executes.
Figure 3:
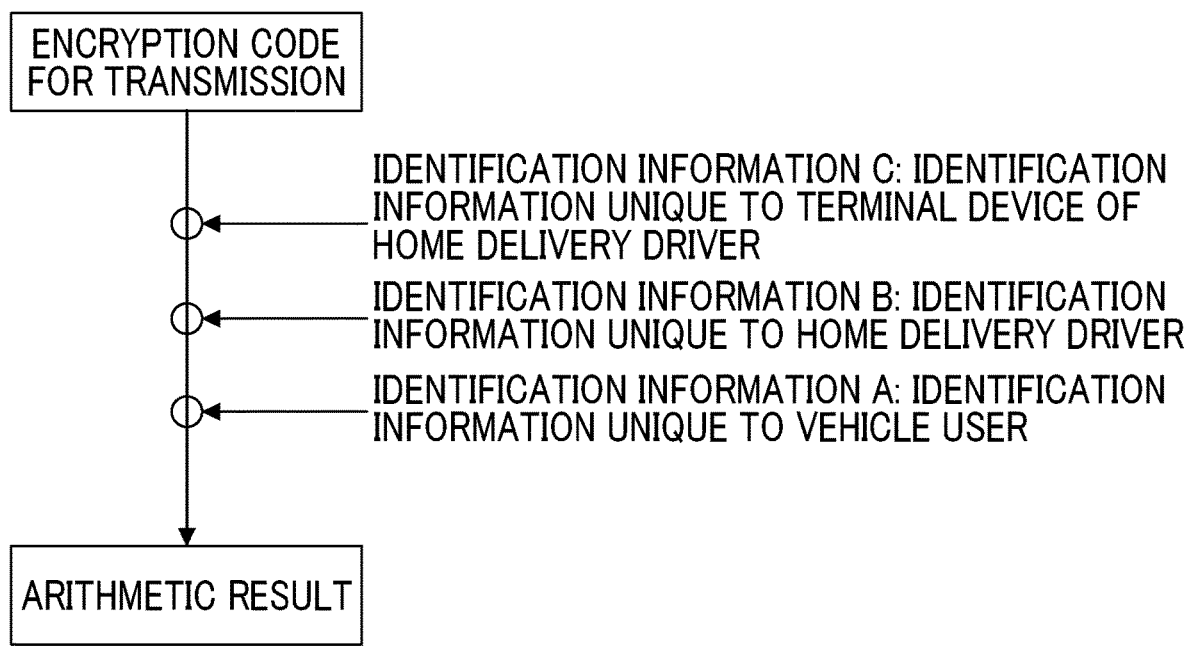
FIG. 3 is a diagram schematically showing authentication processing that an authentication unit of a vehicle shown in FIG. 1 executes.

FIG. 1 is a functional block diagram of an unlocking control system according to an embodiment of the disclosure. FIG. 2 is a diagram schematically showing authentication information generation processing that an authentication information generation unit of a server shown in FIG. 1 executes, and FIG. 3 is a diagram schematically showing authentication processing that an authentication unit of a vehicle shown in FIG. 1 executes. In FIG. 1, a solid line arrow represents a data flow at the time of unlocking control processing, and a broken line arrow represents a data flow at the time of initial registration processing.

The unlocking control system 100 is a system that controls unlocking of a storage 20 such that a home-delivered cargo can be received using the storage 20, such as a trunk in a vehicle 4. The unlocking control system 100 includes a server 3, a vehicle 4, a terminal device 1 of a user 5 (hereinafter, simply referred to as a "user 5") of the vehicle 4 as a first terminal device, and a terminal device 2 of a home delivery driver 6 as a second terminal device. The unlocking control system 100 performs authentication processing based on an unlocking request from the terminal device 2 of the home delivery driver 6, and in a case where authentication is successful, unlocks the storage 20 of the vehicle 4. In the unlocking control system 100 according to the embodiment, identification information (hereinafter, referred to as "identification information A") unique to the user 5 as first identification information, identification information (hereinafter, referred to as "identification information B") unique to the home delivery driver 6 as second identification information, and identification information (hereinafter, referred to as "identification information C") unique to the terminal device 2 of the home delivery driver 6 as third identification information are used in the authentication processing. Hereinafter, the details of each configuration will be described.

Configuration of Server 3

The server 3 can communicate with each of the terminal device 1 of the user 5 of the vehicle 4 and the terminal device 2 of the home delivery driver 6. The server 3 includes a storage unit 10 as a first storage unit, a first identification information reception unit 11, a second identification information reception unit 12, an authentication information generation unit 13, a transmission unit 14, an unlocking request notification unit 15, and an initial registration unit 16.

The storage unit 10 stores an encryption code for unlocking as first authentication information. The encryption code for unlocking is data that is generated based on the identification information A unique to the user 5 when the user 5 performs initial registration for receiving a cargo using the storage 20 of the vehicle 4. The encryption code for unlocking is original data for generating an encryption code for transmission for use in authentication processing in the vehicle 4. Generation processing of the encryption code for transmission will be described below.

The storage unit 10 stores the identification information A transmitted from the terminal device 1 of the user 5 at the time of the initial registration, and the identification information B and the identification information C transmitted from the terminal device 2 of the home delivery driver 6. The identification information A to the identification information C stored in the storage unit 10 can be used in order to authenticate the users of the terminal device 1 and the terminal device 2 at the time of the unlocking control processing.

The first identification information reception unit 11 receives the identification information A transmitted from the terminal device 1 of the user 5. The identification information A is transmitted with unlocking request notification transmitted from the unlocking request notification unit 15 described below to the terminal device 1 as a trigger. The first identification information reception unit 11 compares the received identification information A with the identification information A registered at the time of the initial registration, and determines whether or not the identification information A is authentic. In a case where determination is made that the received identification information A is authentic, the first identification information reception unit 11 outputs the received identification information A to the authentication information generation unit 13.

The second identification information reception unit 12 receives the identification information B unique to the home delivery driver 6 and the identification information C unique to the terminal device 2 of the home delivery driver 6 transmitted from the terminal device 2 of the home delivery driver 6. The identification information B and the identification information C are transmitted from the terminal device 2 of the home delivery driver 6 when an unlocking request of the storage 20 of the vehicle 4 is issued. The second identification information reception unit 12 compares the received identification information B and identification information C with the identification information B and the identification information C registered at the time of the initial registration, and determines whether or not the identification information B and the identification information C are authentic. In a case where determination is made that both of the received identification information B and identification information C are authentic, the second identification information reception unit 12 outputs the received identification information B and identification information C to the authentication information generation unit 13. The second identification information reception unit 12 instructs the unlocking request notification unit 15 to notify the terminal device 1 of the user 5 that the unlocking request is received from the terminal device 2 of the home delivery driver 6.

The authentication information generation unit 13 receives the identification information B and the identification information C from the second identification information reception unit 12. Thereafter, in a case where the identification information A is received from the first identification information reception unit 11, the authentication information generation unit 13 generates an encryption code for transmission as second authentication information based on the encryption code for unlocking and the identification information A to the identification information C stored in the storage unit 10. Specifically, as shown in FIG. 2, an arithmetic operation of the encryption code for unlocking and the identification information A is performed and an arithmetic operation of the arithmetic result and the identification information B is performed according to a predetermined arithmetic algorithm. In addition, an arithmetic operation of the arithmetic result and the identification information C is performed, thereby generating the encryption code for transmission. Here, it is assumed that the encryption code for transmission is reversible encryption. The authentication information generation unit 13 outputs the generated encryption code for transmission and the identification information A to the transmission unit 14.

In a case where the encryption code for transmission and the identification information A are received from the authentication information generation unit 13, the transmission unit 14 transmits the received encryption code for transmission and identification information A to the terminal device 2 of the home delivery driver 6.

The transmission unit 14 transmits the encryption code for unlocking generated in the initial registration unit 16 and an arithmetic algorithm (in the embodiment, since the reversible encryption is employed, an algorithm of an inverse arithmetic operation of an arithmetic operation that the authentication information generation unit 13 executes) corresponding to an arithmetic algorithm of the authentication information generation unit 13 to the vehicle 4 at the time of the initial registration. The arithmetic algorithm can be transmitted, for example, in the form of a program module.

The unlocking request notification unit 15 transmits unlocking request notification representing that the unlocking request is received from the terminal device 2 of the home delivery driver 6 to the terminal device 1 of the user 5 according to an instruction from the second identification information reception unit 12.

Configuration of Vehicle 4

The vehicle 4 can communicate with at least each of the server 3 and the terminal device 2 of the home delivery driver 6 through a network. The vehicle 4 includes the storage 20, a lock 21, a storage unit 22 as a second storage unit, a reception unit 23, an authentication unit 24, and an unlocking controller 25.

The storage 20 is, for example, a trunk provided in the vehicle 4. The storage 20 is provided with an openable lid (not shown) and the lock 21 for locking the lid.

The storage unit 22 stores the same encryption code for unlocking as that stored in the storage unit 10 of the server 3. The encryption code for unlocking is data that is generated in the server 3 at the time of the initial registration of the user 5 and is transmitted from the server 3 to the vehicle 4, and is used when the authentication processing is performed in the vehicle 4. The authentication processing in the vehicle 4 will be described below.

The reception unit 23 receives the identification information A to the identification information C and the encryption code for transmission transmitted from the terminal device 2 of the home delivery driver 6. The identification information A and the encryption code for transmission received from the terminal device 2 of the home delivery driver 6 are those received from the server 3 by the terminal device 2. The identification information B and the identification information C received from the terminal device 2 of the home delivery driver 6 are those input by the home delivery driver 6 at the time of the transmission of the unlocking request or those stored in advance in the terminal device 2. In a case where the identification information A to the identification information C and the encryption code for transmission are received from the terminal device 2, the reception unit 23 outputs the received identification information A to identification information C and encryption code for transmission to the authentication unit 24.

At the time of the initial registration, in a case where the encryption code for unlocking and the arithmetic algorithm are received from the server 3, the reception unit 23 stores the encryption code for unlocking in the storage unit 22 and outputs the arithmetic algorithm to the authentication unit 24.

The authentication unit 24 performs authentication processing using the identification information A to the identification information C acquired from the terminal device 2 of the home delivery driver 6 and the encryption code for unlocking stored in the storage unit 22, and verifies authenticity of the encryption code for transmission received from the terminal device 2 of the home delivery driver 6. Specifically, as shown in FIG. 3, an arithmetic operation of the received encryption code for transmission and identification information C is performed and an arithmetic operation of the arithmetic result and the identification information B is performed according to a predetermined arithmetic algorithm. In addition, an arithmetic operation of the arithmetic result and the identification information A is performed, thereby obtaining an arithmetic result. Since the encryption code for transmission is reversible encryption, the arithmetic operation of each step is an inverse arithmetic operation of the arithmetic operation shown in FIG. 2. The authentication unit 24 compares the arithmetic result obtained by the arithmetic operation with the encryption code for unlocking stored in the storage unit 22. In a case where the arithmetic result and the encryption code for unlocking coincide with each other, the authentication unit 24 determines that the received encryption code for transmission is authentic (authentication is successful). In a case where the arithmetic result and the encryption code for unlocking do not coincide with each other, the authentication unit 24 determines that authentication fails. The authentication unit 24 instructs the unlocking controller 25 to unlock in a case where the authenticity of the received encryption code for transmission is confirmable.

The unlocking controller 25 unlocks the lock 21 of the storage 20 according to the instruction from the authentication unit 24.

Among the functional blocks of the server 3 and the vehicle 4 shown in FIG. 1, the storage unit 10 of the server 3 and the storage unit 22 of the vehicle 4 can be realized by a storage device, such as a memory. The functional blocks other than the storage unit 10 of the server 3 and the storage unit 22 of the vehicle 4 can be realized by storing a program describing processing to be executed by each functional block in a storage device, such as a memory, and making a processor in the server 3 or a computer, such as an ECU of the vehicle 4, read the program from the storage device and execute the program.

Terminal Device 1, Terminal Device 2, and Identification Information A to Identification Information C The terminal device 1 is not particularly limited as long as a device can communicate with the server 3 through a network and can acquire the identification information A of the user 5. As the terminal device 1, a smartphone, a tablet computer, a personal computer, a camera-equipped mobile phone, or the like can be used. Similarly, the terminal device 2 is not particularly limited as long as a device can communicate with the server 3 and the vehicle 4 through the network and can acquire the identification information B of the home delivery driver 6. As the terminal device 2, a smartphone, a tablet computer, a potable point of sales (POS) terminal, a personal computer, a camera-equipped mobile phone, or the like can be used. Processing that the terminal device 1 and the terminal device 2 execute can be realized by storing programs describing processing to be executed by the terminal device 1 and the terminal device 2 in the storage devices of the terminal device 1 and the terminal device 2, and making the processors of the terminal device 1 and the terminal device 2 read the programs from the storage devices and execute the programs.

The identification information A of the user 5 and the identification information B of the home delivery driver 6 may be unique information capable of specifying the personals, and for example, data or the like generated from a personal identification number, a password, a signature, and biological information can be used. As the biological information, a face, a fingerprint, a vein of a finger or a hand, an iris, a voiceprint, a retina, a deoxyribonucleic acid (DNA), or the like can be used. Out of the above-described biological information, as the identification information A and the identification information B, for example, it is preferable that data generated from the biological information is used. In general, in authentication using data generated from the biological information, spoofing or falsification is difficult; thus, biological information is used as identification information unique to a personal, whereby it is possible to further improve security. Data generated from the biological information includes, in addition to image data obtained by capturing a living body, such as a face, a fingerprint, or a vein, data obtained by subjecting predetermined image processing to captured image data or data representing a feature point or a feature quantity extracted from image data after processing.

As the identification information C unique to the terminal device 2, unique and unchangeable information, such as an individual identification number or a serial number, is used.

Flow of Processing

Hereinafter, the flow of processing of the unlocking control system according to the embodiment will be described referring to FIG. 1 and FIGS. 4 to 6 together.

Figure 4:
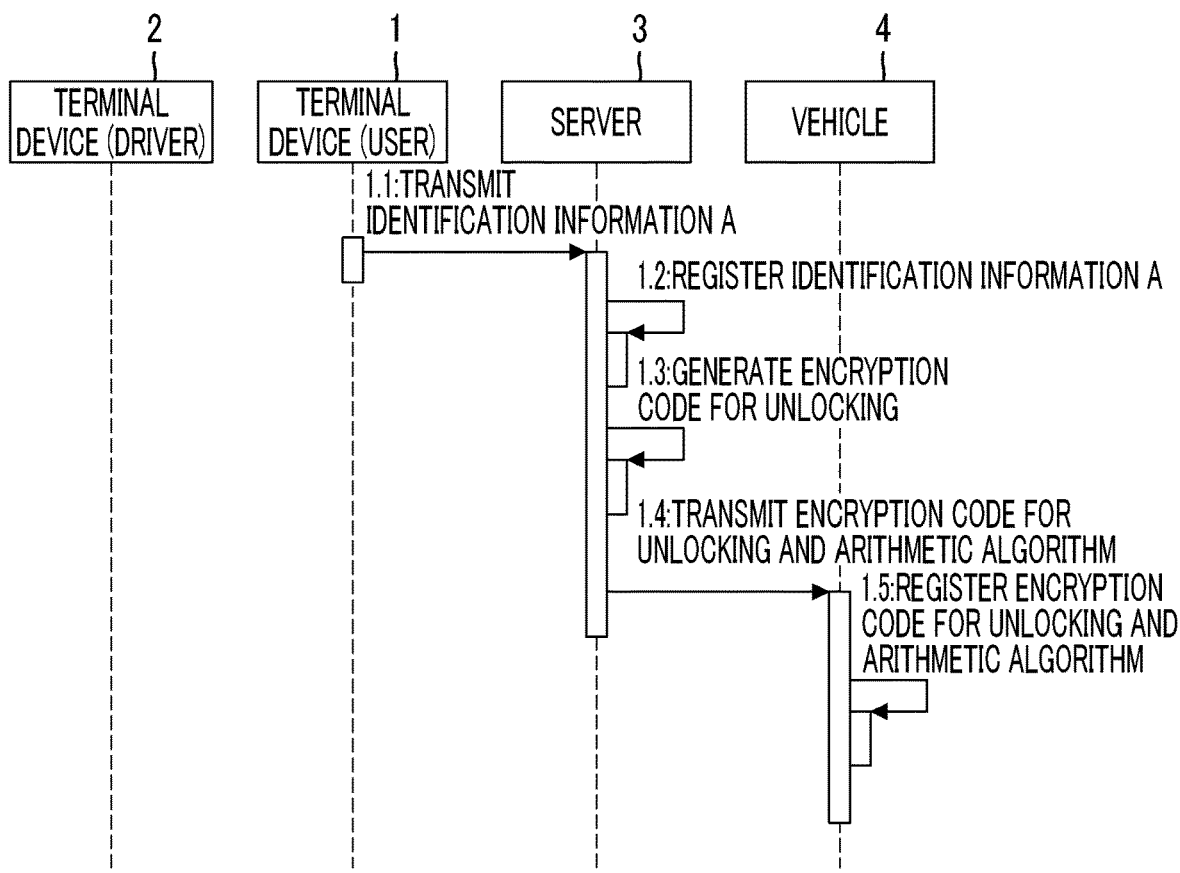
FIG. 4 is a sequence diagram showing initial registration processing by a user of a vehicle.

FIG. 4 is a sequence diagram showing initial registration processing by the user of the vehicle.

First, the identification information A is transmitted from the terminal device 1 of the user 5 to the server 3 (Step 1.1). Next, the initial registration unit 16 of the server 3 stores the received identification information A in the storage unit 10 (Step 1.2). Next, the initial registration unit 16 of the server 3 performs a predetermined arithmetic operation using the received identification information A to generate the encryption code for unlocking (Step 1.3). The generated encryption code for unlocking is stored in the storage unit 10 of the server 3. Next, the transmission unit 14 of the server 3 transmits the encryption code for unlocking generated by the initial registration unit 16 and the arithmetic algorithm to the vehicle 4 (Step 1.4). Next, the reception unit 23 of the vehicle 4 receives the encryption code for unlocking and the arithmetic algorithm from the server 3, the received encryption code for unlocking is stored in the storage unit 22, and the received arithmetic algorithm is output to the authentication unit 24 (Step 1.5). With the above processing, the initial registration processing of the user 5 is completed.

Although the initial registration processing shown in FIG. 4 is processing that is executed when the user 5 starts to use a reception service of a cargo using the storage 20 of the vehicle 4, the initial registration processing may be executed as processing for re-registration in a case where the identification information A of the user 5 is updated, in a case where the arithmetic algorithm that the authentication information generation unit 13 of the server 3 executes is updated, or the like. In FIG. 4, although an example where the user 5 executes the initial registration using the terminal device 1 has been described, the initial registration may be executed from another terminal device.

Figure 5:
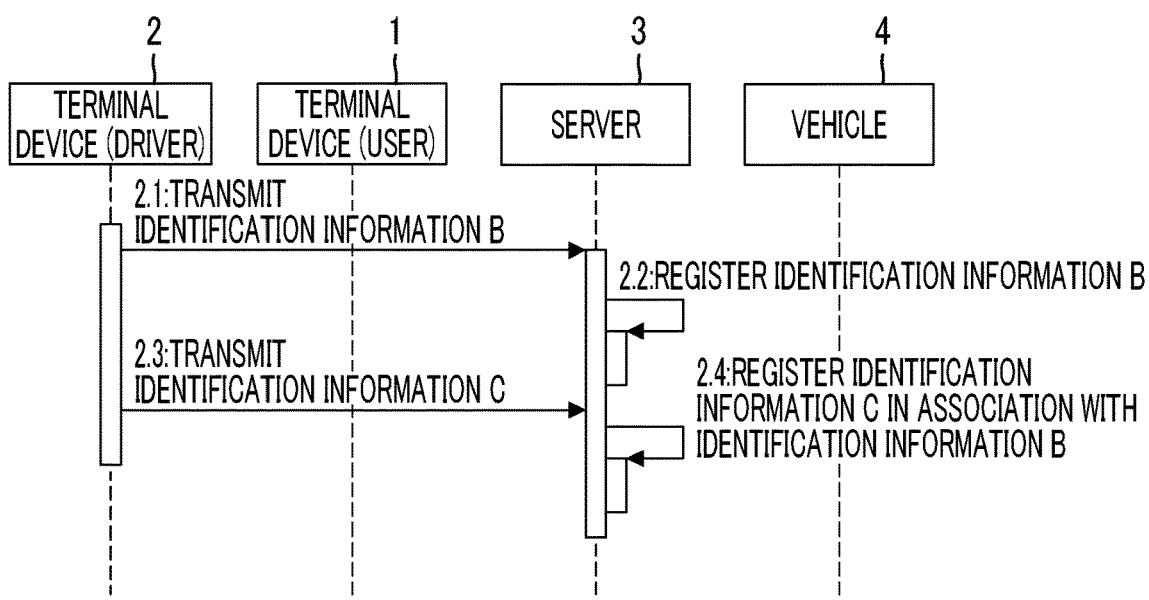
FIG. 5 is a sequence diagram of initial registration processing by a home delivery driver.

FIG. 5 is a sequence diagram showing initial registration processing by the home delivery driver.

First, the identification information B is transmitted from the terminal device 2 of the home delivery driver 6 to the server 3 (Step 2.1). Next, the initial registration unit 16 of the server 3 stores the received identification information B in the storage unit 10 (Step 2.2). Next, the identification information C is transmitted from the terminal device 2 of the home delivery driver 6 to the server 3 (Step 2.3). Next, the initial registration unit 16 of the server 3 stores the received identification information C in the storage unit 10 in association with the identification information B (Step 2.4). With the above processing, the initial registration processing of the home delivery driver 6 and the terminal device 2 is completed.

Although the initial registration processing shown in FIG. 5 is processing that is executed in order to register the home delivery driver 6 who delivers the cargo and the terminal device 2 to be used by the home delivery driver 6 when the reception service of the cargo using the storage 20 of the vehicle 4 starts to be provided, the initial registration processing may be executed as processing for re-registration. The identification information B of the home delivery driver 6 may be initially registered from another terminal device other than the terminal device 2, as in the embodiment, in a case where the identification information C of the terminal device 2 is also registered, for example, it is possible to register the identification information B and the identification information C using the terminal device 2 in registering the identification information B and the identification information C in association with each other.

Figure 6:
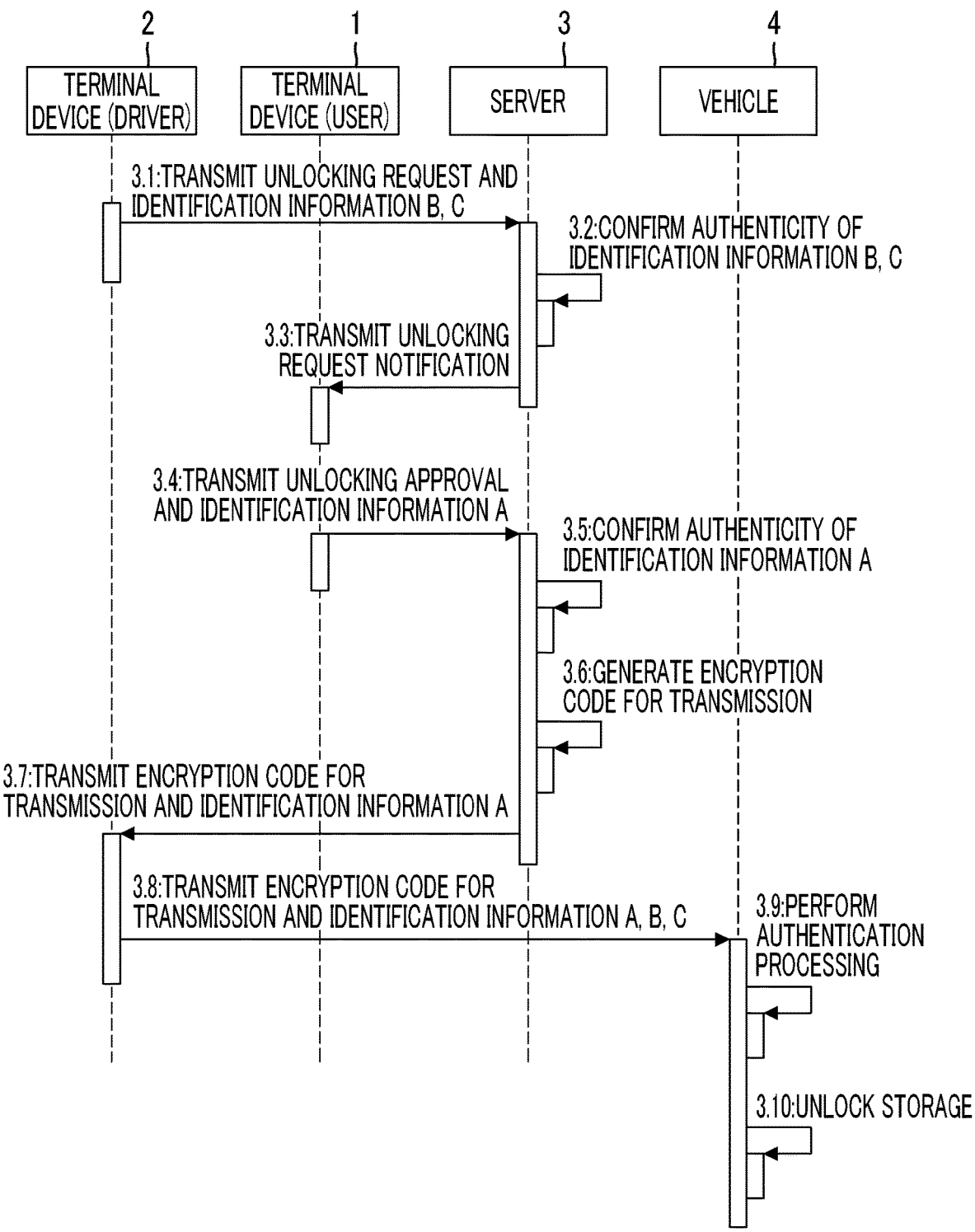
FIG. 6 is a sequence diagram showing unlocking control processing.

FIG. 6 is a sequence diagram showing unlocking control processing. The unlocking control processing of FIG. 6 may be executed in a case where the user 5 designates delivery of a cargo to the storage 20 of the vehicle 4 in advance or may be executed in a case where the user 5 is absent and the home delivery driver 6 does not deliver the cargo.

First, the unlocking request for unlocking of the storage 20 of the vehicle 4, and the identification information B and the identification information C are transmitted from the terminal device 2 of the home delivery driver 6 to the server 3 (Step 3.1). The unlocking request and the identification information B, C may be transmitted simultaneously, or after the unlocking request is transmitted, the identification information B and the identification information C may be transmitted successively.

Next, in a case where the second identification information reception unit 12 of the server 3 receives the identification information B and the identification information C, the authenticity of the received identification information B and identification information C is confirmed (Step 3.2). In a case where the received identification information B and identification information C are confirmable to be authentic, the second identification information reception unit 12 instructs the unlocking request notification unit 15 to transmit, to the terminal device 1, the unlocking request notification indicating that there is the unlocking request (Step 3.3). In Step 3.2, in a case where the authenticity of the received identification information B and identification information C is not confirmable, subsequent processing may not be performed, and error processing for transmitting an error message from the transmission unit 14 of the server 3 to the terminal device 2 may be performed. In a case where an error frequency becomes equal to or greater than a given frequency, access from the terminal device 2 transmitting the unlocking request to the server 3 may be restricted.

Next, in a case where the terminal device 1 of the user 5 receives the unlocking request notification from the server 3, an unlocking approval approving the unlocking of the storage 20 of the vehicle 4 and the identification information A are transmitted from the terminal device 1 to the server 3 (Step 3.4). The unlocking approval and the identification information A may be transmitted simultaneously, or after the unlocking approval is transmitted, the identification information A may be transmitted successively. When the user 5 approves the unlocking of the storage 20 of the vehicle 4, a time at which the home delivery driver 6 can unlock the storage 20 of the vehicle 4 may be set.

Next, in a case where the first identification information reception unit 11 of the server 3 receives the identification information A, the authenticity of the received identification information A is confirmed (Step 3.5). In a case where the received identification information A is confirmable to be authentic, the authentication information generation unit 13 generates the encryption code for transmission using the identification information A acquired from the terminal device 1 along with the unlocking approval, the identification information B and the identification information C acquired from the terminal device 2 along with the unlocking request, and the encryption code for unlocking stored in the storage unit 10 (Step 3.6, see FIG. 2). In a case where the authenticity of the identification information A received in Step 3.5 is not confirmable, subsequent processing may not be performed, and error processing for transmitting an error message from the transmission unit 14 of the server 3 to the terminal device 1 may be performed. In a case where an error frequency becomes equal to or greater than a given frequency, a message indicating that delivery to the storage 20 of the vehicle 4 is not possible may be transmitted to the terminal device 2 of the home delivery driver 6. Next, the transmission unit 14 of the server 3 transmits the encryption code for transmission generated by the authentication information generation unit and the identification information A acquired along with the unlocking approval to the terminal device 2 (Step 3.7).

Next, in a case where the terminal device 2 of the home delivery driver 6 receives the encryption code for transmission and the identification information A, the received encryption code for transmission and identification information A, the identification information B of the home delivery driver 6, and the identification information C of the terminal device 2 are transmitted to the vehicle 4 (Step 3.8). The transmission processing of Step 3.8 is performed using communication means (for example, Wi-Fi (Registered Trademark) or Bluetooth (Registered Trademark)) for directly communicating with communication modules mounted in the terminal device 2 and the vehicle 4. In a case where direct communication with the communication modules mounted in the terminal device 2 and the vehicle 4 is used, the home delivery driver 6 can unlock the storage 20 even in a case where the vehicle 4 is parked at a place where the server 3 and the vehicle 4 cannot communicate with each other, such as an underground parking lot, under a condition that the processing until Step 3.7 is completed in advance.

Next, in a case where the reception unit 23 of the vehicle 4 receives the encryption code for transmission and the identification information A to the identification information C from the terminal device 2, the authentication unit 24 executes the authentication processing (Step 3.9, see FIG. 3). In a case where the authentication processing is successful, the authentication unit 24 makes the unlocking controller 25 unlock the lock 21 of the storage 20. With this, the home delivery driver 6 can open the lid of the storage 20 and can store a cargo in the storage 20. In Step 3.9, in a case where the authentication processing fails, the lock of the storage 20 is not unlocked, and error processing for transmitting a retransmission instruction of the encryption code for transmission and the identification information A to the identification information C from the communication module of the vehicle 4 to the terminal device 2 is appropriately executed.

Effects and the Like

As described above, in the unlocking control system 100 according to the embodiment, solely in a case where the identification information A of the user 5, the identification information B of the home delivery driver 6, and the identification information C of the terminal device 2, and the encryption code for transmission generated by the server 3 are confirmed to be authentic, the storage 20 can be unlocked. In addition to a plurality of kinds of information in the authentication processing in the vehicle, the encryption code for unlocking and the arithmetic algorithm are given solely to the server 3 and the vehicle 4, and are brought into a black box; thus, falsification of information for use in the authentication processing is extremely difficult. According to the embodiment, it is possible to realize the unlocking control system 100 with further improved security.

In a case where biological information is used as the identification information A of the user 5 and the identification information B of the home delivery driver 6, it is possible to further improve security.

In the embodiment, reversible encryption is used for the encryption code for transmission generated from the encryption code for unlocking, and in the authentication unit 24 of the vehicle 4, the encryption code for unlocking of original data is obtained by an inverse arithmetic operation. In this case, even in a case where the home delivery driver 6 and the terminal device 2 are changed, and the identification information B and the identification information C are changed to a combination different from a previous combination, the encryption code for unlocking to be compared is not changed; thus, it is possible to avoid failure in authentication in an undesirable manner.

Other Modification Examples

In the above-described embodiment, although the three pieces of the identification information A to the identification information C are used in order to generate the encryption code for transmission in the server 3, the encryption code for transmission may be generated based on two kinds of identification information of the identification information A of the user 5 and the identification information B of the home delivery driver 6.

As in the above-described embodiment, in a case where the identification information B of the home delivery driver 6 and the identification information C of the terminal device 2 are used together, the encryption code for transmission generated from the encryption code for unlocking may be irreversible encryption. Specifically, authentication can be performed by generating a password for transmission based on the identification information A, the identification information B, the identification information C received on the vehicle side and the stored encryption code for unlocking according to the same algorithm as in the server 3, and comparing the password for transmission with the sent encryption code for transmission. In a case where the irreversible encryption is employed, an original encryption code for unlocking cannot be restored even in a case where encryption code for transmission or the identification information A to the identification information C leak; thus, it is possible to further improve security.

Figure 7:
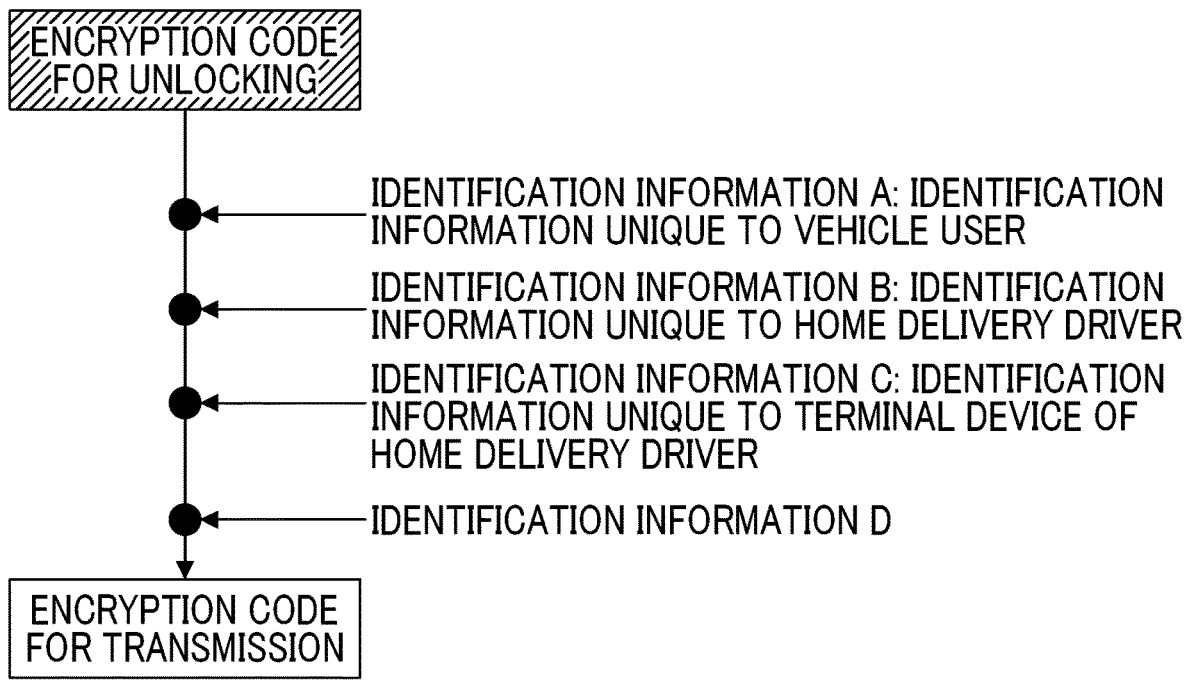
FIG. 7 is a diagram schematically showing authentication information generation processing in another modification example.
Figure 8:
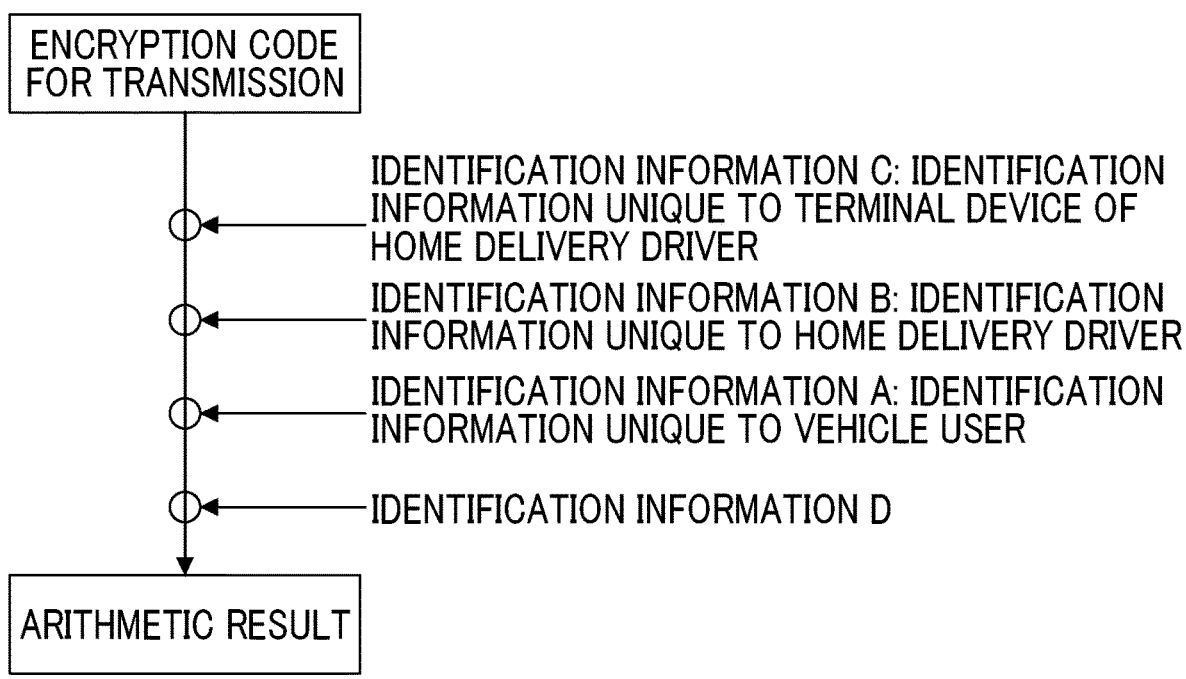
FIG. 8 is a diagram schematically showing authentication processing in another modification example.

In the above-described embodiment, the identification information D may be further used as fourth identification information to generate the encryption code for transmission. Specifically, in FIG. 2, the authentication information generation unit 13 may add processing for performing an arithmetic operation an arithmetic result obtained using one of the identification information A to the identification information C and the identification information D (FIG. 7). In this case, the authentication unit 24 of the vehicle 4 may add processing for performing an arithmetic operation using the identification information D in addition to the identification information A to the identification information C in FIG. 3 (FIG. 8). In a case where the identification information D is added, for example, it is preferable from a point of further improving security with different information for every delivery of a cargo, and as the identification information D, for example, an identification code allocated to a cargo, a rolling code, a one-time password, or the like can be used. In this case, the identification information D may be transmitted from the transmission unit 14 of the server 3 to the terminal device 2 of the home delivery driver 6 or the home delivery driver 6 may input the identification information D using the terminal device 2 such that authentication in the vehicle 4 can be performed.

In the above-described embodiment, in Step 3.8 of FIG. 6, it is preferable that the identification information B transmitted from the terminal device 2 of the home delivery driver 6 to the vehicle 4 is input again immediately, for example, before performing Step 3.8. In this case, it is possible to suppress spoofing in a case where the terminal device 2 is robbed, and to further improve security.

As in the above-described embodiment, the arithmetic algorithm may be registered in the vehicle 4 in a manufacturing stage or a vehicle delivery stage of the vehicle 4, instead of transmitting the arithmetic algorithm (program module or the like) from the server 3 to the vehicle 4 at the time of the initial registration of the user 5. However, as in the above-described embodiment, it is preferable that the arithmetic algorithm can be transmitted from the server 3 to the vehicle 4 since the arithmetic algorithm can be changed later.

In the above-described embodiment, the identification information A may be transmitted from the server 3 to the vehicle 4 and registered in the vehicle 4 at the time of the initial registration of the user 5.

Although the unlocking control system described in the above-described embodiment is preferably applied to, for example, a vehicle having a closed trunk for security, the unlocking control system can also be applied to a vehicle having an open trunk.

As means for authenticating whether or not the home delivery driver 6 is an authorized driver, authentication may be performed by a server of a third-party institution. That is, when the home delivery driver 6 performs unlocking processing, solely the unlocking request to request the unlocking of the storage 20 of the vehicle 4 is transmitted from the terminal device 2 of the home delivery driver 6 to the server 3, and the identification information B and the identification information C are transmitted to the server of the third-party institution. In a case where determination is made that the transmitted identification information B and the identification information C are authorized based on information registered in advance, the server of the third-party institution notifies the terminal device 1 of the user 5 of a result. The user 5 transmits the unlocking approval and the identification information A to the server 3 based on the unlocking request notification transmitted from the server 3 and an authentication result sent from the server of the third-party institution. As described above, the authentication of the home delivery driver 6 is made to be performed by the server of the third-party institution, whereby it is possible to further improve reliability for authentication. It is preferable that the third-party institution used herein is, for example, at least a company that the home delivery driver 6 belongs to, or an institution disinterested in an organization or the like.

In the above-described embodiment, a configuration in which, in a case where the terminal device 1 of the user 5 receives the unlocking request notification from the server 3, the unlocking approval approving the unlocking of the storage 20 of the vehicle 4 and the identification information A are transmitted to the server 3 has been described. However, in a case where the terminal device 1 of the user 5 receives the unlocking request notification from the server 3, solely the unlocking approval may be transmitted, and the identification information A may be registered in the vehicle at the time of the initial registration. In this way, the identification information A of the user 5 is not transmitted to the server 3 or the home delivery driver 6, and it is possible to further increase security.

The disclosure can be used in order to control unlocking of a storage, such as a trunk of a vehicle, and in particular, can be suitably used in a service where a home-delivered cargo is received using the storage of the vehicle.

What is claimed is:

1. An unlocking control system comprising:
   a first terminal device;
   a second terminal device different from the first terminal device;
   a server configured to communicate with the first terminal device and the second terminal device; and
   a vehicle having a storage of a cargo and configured to communicate with the second terminal device, wherein:
   the server includes a first storage unit configured to store first authentication information;
   the server is configured to
      receive first identification information unique to a user of the vehicle from the first terminal device and confirm authenticity of the received first identification information,
      receive second identification information unique to a user of the second terminal device from the second terminal device and confirm authenticity of the received second identification information,
      generate second authentication information based on the first identification information received from the first terminal device, the second identification information received from the second terminal device, and the first authentication information stored in the first storage unit, and
      transmit the generated second authentication information and the first identification information to the second terminal device; and
   the vehicle includes
      a second storage unit configured to store the first authentication information, and
      an electronic control unit configured to
         receive the second authentication information, the first identification information, and the second identification information from the second terminal device,
         verify authenticity of the second authentication information received from the second terminal device based on the first identification information and the second identification information received from the second terminal device, and the first authentication information stored in the second storage unit, and
         in a case where the authenticity of the second authentication information is confirmed, unlock the storage of the cargo,
   wherein:
   the server is further configured to
      receive third identification information unique to the second terminal device from the second terminal device, and
      generate the second authentication information based on the third identification information in addition to the first identification information and the second identification information; and
   the electronic control unit of the vehicle is configured to verify authenticity of the second authentication information based on the first identification information, the second identification information, and the third identification information received from the second terminal device, and the first authentication information stored in the second storage unit.

2. The unlocking control system according to claim 1, wherein:
the server is configured to generate the second authentication information using fourth identification information in addition to the first identification information, the second identification information, and the third identification information, and transmit the fourth identification information to the second terminal device along with the second authentication information and the first identification information; and
the electronic control unit of the vehicle is configured to verify the authenticity of the second authentication information based on the first identification information, the second identification information, the third identification information, and the fourth identification information acquired from the second terminal device, and the first authentication information stored in the second storage unit.

3. The unlocking control system according to claim 1, wherein the first identification information and the second identification information include biological information of the user of the first terminal device and biological information of the user of the second terminal device, respectively.

4. An unlocking control method that unlocks a storage of a vehicle based on an unlocking request from a second terminal device, in an unlocking control system including a first terminal device, the second terminal device different from the first terminal device, a server configured to communicate with the first terminal device and the second terminal device, and the vehicle having the storage of a cargo and configured to communicate with the second terminal device, the unlocking control method comprising:
transmitting first identification information from the first terminal device to the server;
causing the server to receive the first identification information and store the received first identification information in a first storage unit;
causing the server to perform a predetermined arithmetic operation using the received first identification information to generate first authentication information;
causing the server to transmit the first authentication information and an arithmetic algorithm to the vehicle;
transmitting second identification information from the second terminal device to the server;
causing the server to receive the second identification information and store the received second identification information in the first storage unit;
transmitting third identification information from the second terminal device to the server;
causing the server to receive the third identification information and store the received third identification information in the first storage unit in association with the second identification information;
transmitting an unlocking request for unlocking of the storage of the vehicle, the second identification information, and the third identification information from the second terminal device to the server;
causing the server to confirm authenticity of the received second identification information and third identification information;
in a case where the second identification information and the third identification information are confirmable to be authentic, causing the server to transmit, to the first terminal device, unlocking request notification indicating that there is an unlocking request;
in a case where the first terminal device receives the unlocking request notification from the server, transmitting an unlocking approval approving the unlocking of the storage of the vehicle and the first identification information from the first terminal device to the server;
in a case where the first identification information is received, causing the server to confirm authenticity of the received first identification information;
in a case where the received first identification information is confirmable to be authentic, causing the server to generate second authentication information using the first identification information acquired from the first terminal device along with the unlocking approval, the second identification information and the third identification information acquired from the second terminal device along with the unlocking request, and the first authentication information stored in the first storage unit;
causing the server to transmit the generated second authentication information and the first identification information acquired along with the unlocking approval to the second terminal device;
in a case where the second authentication information and the first identification information are received, causing the second terminal device to transmit the received second authentication information and first identification information, the second identification information, and the third identification information to the vehicle; and
in a case where the second authentication information and the first identification information, the second identification information, and the third identification information are received from the second terminal device, causing the vehicle to execute authentication processing and to unlock the storage.

* * * * *